(No Model.) 2 Sheets—Sheet 1.
D. R. SPRINGER.
GRAIN DUMPING MACHINE.
No. 423,828. Patented Mar. 18, 1890.
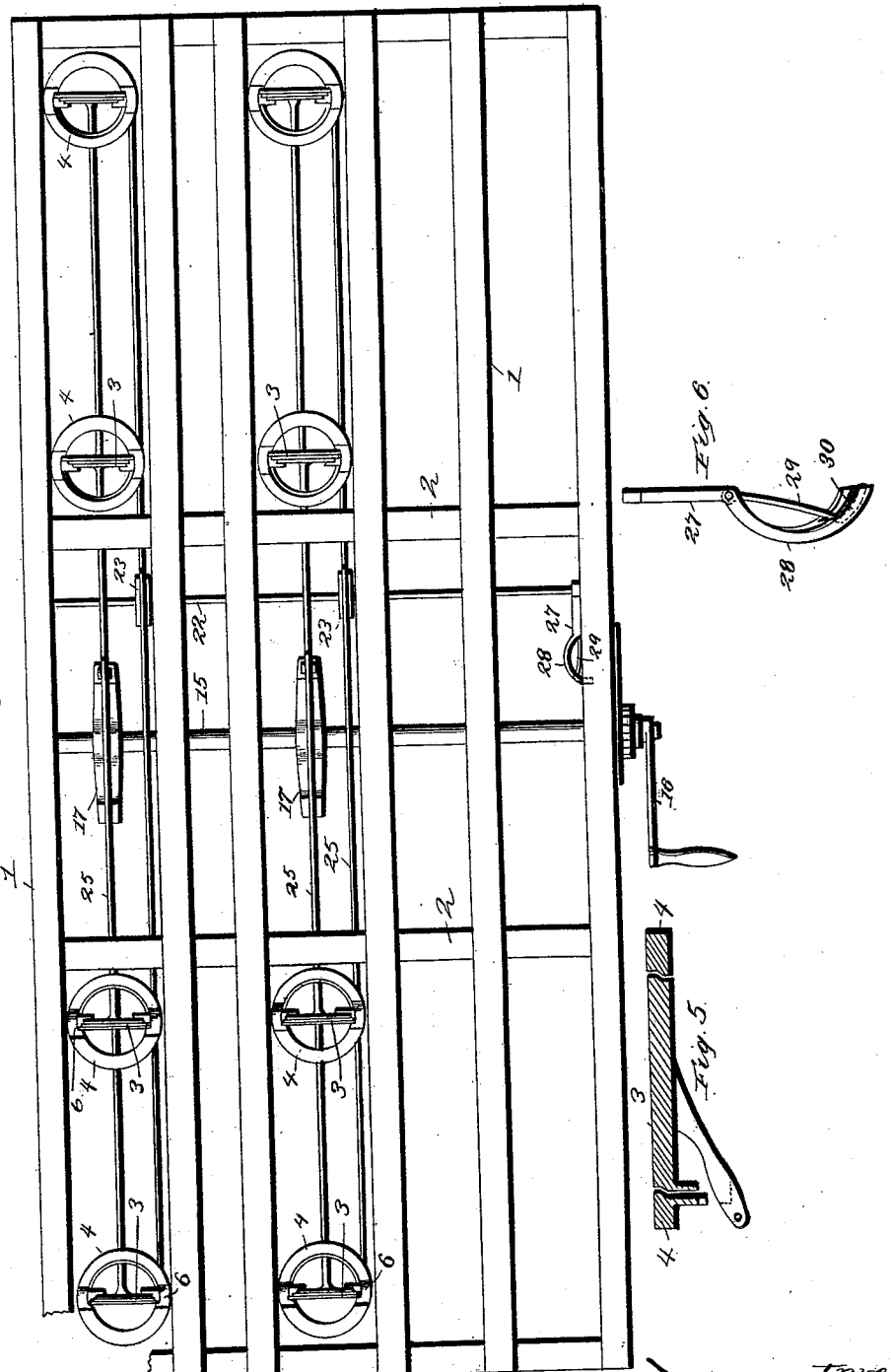

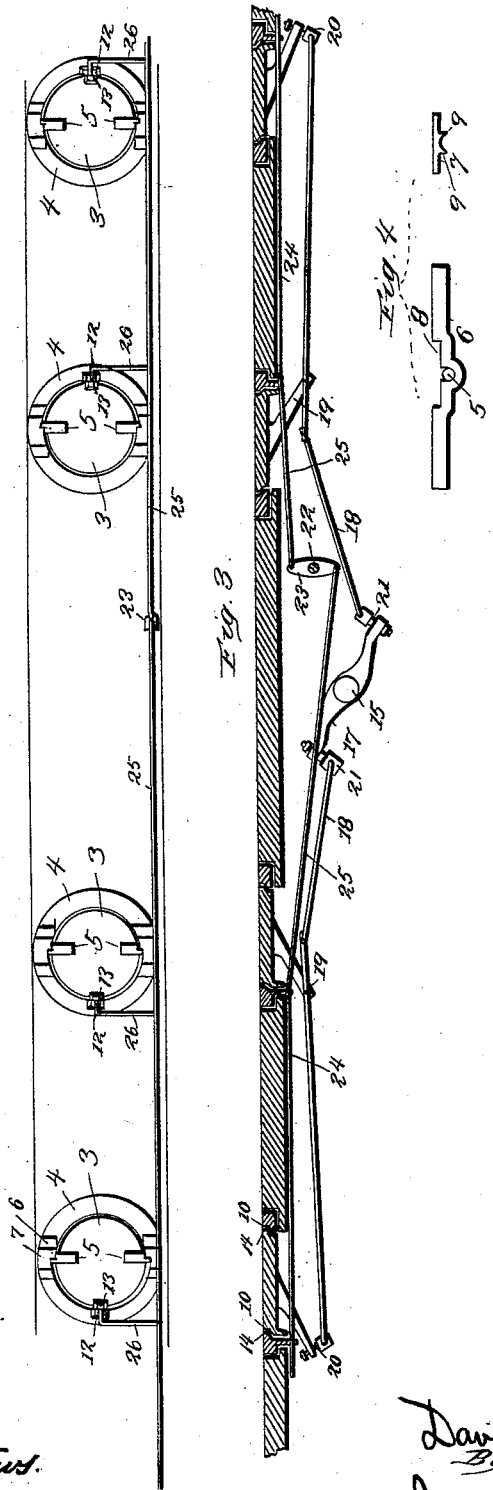

UNITED STATES PATENT OFFICE.

DAVID R. SPRINGER, OF PHILADELPHIA, PENNSYLVANIA.

GRAIN-DUMPING MACHINE.

SPECIFICATION forming part of Letters Patent No. 423,828, dated March 18, 1890.

Application filed November 20, 1889. Serial No. 331,037. (No model.)

*To all whom it may concern:*

Be it known that I, DAVID R. SPRINGER, a citizen of the United States, residing at Philadelphia, in the county of Philadelphia and State of Pennsylvania, have invented certain new and useful Improvements in Grain Cars or Wagons, of which the following is a specification.

In the transportation of grain and such like material one of the items of cost is the loading and unloading of it to and from the cars or vehicles on which it is transported.

My invention relates to the construction of the cars or other vehicles, by means of which their contents can be discharged automatically by opening doors or holes in the bottom of the car, as will be hereinafter more particularly set forth.

Referring to the accompanying drawings, in which the same numerals indicate corresponding parts in each of the figures, Figure 1 is a plan view of the frame of the bottom of a car, showing a number of doors open and the means for operating them. Fig. 2 is a bottom plan view of a section of the bottom of a car, showing the doors closed and locked. Fig. 3 is a longitudinal vertical sectional view of the bottom of a car, and Figs. 4, 5, and 6 are detail views.

Although my invention may be applied to the ordinary cars or wagons, I have shown it applied to a car having the longitudinal sills 11, arranged in pairs, with a series of doors or openings located at any desired distances apart between each pair; but the arrangement of the sills and doors may be changed as desired. As many cross-sills 2 2 may be used as is necessary to give the necessary strength and rigidity to the car.

The openings through which the grain escapes are each provided with a door or tilting platform 3, pivotally secured within a frame or ring 4, which is bolted or otherwise secured to the bottom of the car. Each door or platform is provided with pivots or trunnions 5 5, which rock in suitable boxings in the sides of the frame, the boxings each consisting, preferably, of two parts 6 and 7, as shown in Fig. 4. The bottom part or base 6 of each boxing is provided with a recess 8, in which the top part is seated, the top part being provided with a semicircular seat and having sides or projections 9 9, which fit down into the seat for the trunnions in the base. This construction throws the entire weight of the door and its load onto the base, which is securely fastened to the ring or the bottom of the car in any suitable manner, and prevents the trunnions from being displaced in rocking the door.

As the doors are only intended to be rocked or tilted in one direction to discharge the contents of the car, the opposite side of each door is provided with a beveled or inclined edge 10, which engages with or rests against a corresponding inclined portion 11 of the frame or ring 4. When the door is closed, the weight of the load on the door on one side of the pivots or trunnions will press that side of the door down tight against the beveled face of the frame and prevent the escape of the grain, and will also force the beveled face on the opposite side of the door, which is inclined in the opposite direction, up against the beveled portion of the frame on that side and prevent the escape of the grain at that point; but to prevent any danger or liability of the door opening at any time, and thus permitting the grain to escape and be wasted, a lock or bolt 12 may be placed in a keeper 13 on the bottom side of the ring and be made to engage with the edge or side of the door and hold it securely in place until it is desired to open the door, when the bolt can be withdrawn.

Instead of having the beveled or inclined portions of the door and frame extending entirely across the edge, it can be made to extend only a portion of the way, and the rest of the edge can be made straight, as shown at 14. This will make an angle or shoulder in the joint between the door and its frame, which will assist in preventing the escape of the grain when the door is closed.

In order to open all the doors and with the least trouble in the shortest time, I prefer to connect them all with a shaft 15, which is journaled transversely across the bottom of the car in any suitable manner, as by ordinary brackets or hangers. The shaft is provided at one end, which projects beyond the side of the car, with a crank 16, by means of which it can be rotated in either direction and then retained by means of a pawl and ratchet 16, although the ratchet is only needed when the doors are closed to assist in keeping them so. Cross-arms 17 17 are secured on the shaft in a line with each series or row of doors lengthwise of the car, and connecting-rods 18 18 are secured to the ends of the cross-arms and with arms 19 19 on the lower side of the doors, the doors being arranged on the opposite sides of the shaft to open or tilt in opposite directions, although they can be arranged to all open in the same direction with only one arm and connecting-rod for each series of doors. These connecting-rods can be passed directly through the arms of the doors adjacent to the shaft and be secured thereto by means of a pin passing through them; but with the outer arms I prefer to use screw-threaded pins or bolts 20, which can thus be adjustably secured to the arms, and thus cause the doors to be closed tightly by the rocking of the shaft 15. To adjust the closing of the other doors, the connecting-rods are secured to the ends of the cross-arms by the same kind of pins or bolts 21 as are used upon the arms of the end doors, as above described.

I prefer to make each of the connecting-rods out of two pieces hinged together intermediate the ends of the cross-arm and the arm of the nearest door, as this will permit of the cross-arm moving in the arc of a circle as the shaft is rotated, and also permit the main portion of the rod moving longitudinally along the bottom of the car. The doors nearest the shaft are first adjusted to close when the shaft is rotated to the desired point by adjusting the bolt 21, and then the outer doors are adjusted by moving the bolts 20 back or forth through the end of the arm on the bottom of the door.

To facilitate the locking and unlocking of the doors, I prefer to connect all the bolts or locks with a shaft 22, so that by rotating the shaft all the locks or bolts can be moved simultaneously. The shaft 22 is journaled transversely across the bottom of the car in any ordinary manner similar to that described for the shaft 15. It is also provided with cross-arms 23, to which sliding bars 24 24 are connected by means of rods or links 25 25. The bars 24 are arranged at the sides of the doors, so that they will not interfere with them when the doors are being operated, and consequently each rod must be provided at each door with a laterally-projecting arm 26, to the outer end of which the bolt or lock 12 is secured.

As the door and frame are of a less thickness than the bottom of support for them, I prefer to form the keeper 13 upon the under side of the frame long enough so that it will project down below the level of the lower surface of the bottom of the car, so that the arm 26, to which the bolts are secured, can be moved back and forth by the bars 24 without coming in contact with any portion of the bottom of the car or without requiring any portion of the car to be cut away to make room for them.

A lug may be formed on the bottom of the door to rest on the end of the lock or bolt when the device is closed and locked. One end of the shaft 22 is provided with an arm or handle 27, by which it is operated, and which is preferably located just within the outside sill of the bottom of the car. This arm has its end curved, as shown at 28, which gives a convenient means of grasping it to operate the locks, and also acts as a shield or protector for a lock 29 for holding the arm in any desired position. The lock 29 may be made in any convenient way; but I have shown it as an L-shaped rod with one end pivoted to the arm at one end of the curved portion and having its other or bent end fitting within a slot 30 in the other or free end of the curved portion of the arm.

The side of the sill of the car is provided with holes, as shown in dotted lines in Fig. 1, or other devices with which the end of the lock engages and locks the arm.

When it is desired to move the arm to unlock the doors, the attendant reaches in under the sill of the car and withdraws the lock 29 and moves the arm in the desired direction. By making the lock 29 self-actuating by making it spring-actuated or out of flexible material it will automatically engage with the means of securement on the side of the sill as soon as the attendant relaxes his hold upon it.

When a car is to be filled, the doors are all closed by rotating the shaft 15, and they are then locked by rotating the shaft 22, which will slip all the bolts 12 through the keepers 13 and cause their inner ends to engage with the doors and hold them in place.

In unloading the car the bolts are first withdrawn by rotating the shaft 22 in direction from that required to lock the doors, and the doors are then all rocked or tilted up edgewise, as shown in Fig. 1, by rotating the shaft 15 by means of the handle at the end side of the car. This will permit the contents of the car to discharge through the bottom very rapidly and without any more power than is required to open the doors, as above described.

Without limiting myself to the exact construction shown, I claim—

1. A car having its bottom provided with discharge-openings arranged in series, pivoted doors arranged to swing within said openings, and means for operating them in unison and for locking all of them simultaneously, substantially as described.

2. A car having its bottom provided with discharge-openings arranged in series lengthwise of the car, a pivoted door arranged to swing within each of said openings, connecting-rods for each of the series, and a shaft journaled transversely across the bottom of the car for operating all of the rods and doors in unison, substantially as described.

3. A car having its bottom provided with discharge-openings arranged in series, a door for each opening, having an arm on its under side, connecting-rods for each series of doors secured to the arms thereof, and a shaft provided with a cross-arm for each series of doors, to which the connecting-rods are attached, substantially as described.

4. A car having its bottom provided with discharge-openings arranged in series, a door for each opening, having an arm on its under side, an operating-shaft having cross-arms secured thereto, an adjustable bolt in the ends of the cross-arms and in the arm of the outer doors, and connecting-rods secured to said bolts, substantially as described.

5. A car having its bottom provided with discharge-openings arranged in series lengthwise of the car, a door for each opening, a lock for each door, and sliding bars connected with the locks for the doors for each series, and means for operating the bars and locks simultaneously, substantially as described.

6. A car having its bottom provided with discharge-openings arranged in series lengthwise of the car, a door for each opening, a lock for each door, a sliding bar at the side of the door of each series, an arm extending laterally from the bar at each door, the outer end of which is secured to the lock for that door, and a shaft transversely across the bottom of the car, having cross-arms for operating said bars, substantially as described.

7. A car having its bottom provided with discharge-openings, a door for each opening, a lock for each door, a shaft for operating the locks simultaneously, an arm secured to one end of the shaft, having a curved portion or shield, and a lock within the curved portion for engaging with the bottom of the car, substantially as described.

8. A car having its bottom provided with openings, a door for each opening, a lock for each door, a shaft transversely of the car for operating the locks simultaneously, an arm at one end of the shaft, having a slotted curved portion, an L-shaped lock pivotally secured at one end to one end of the curved portion of the arm and fitting within the slotted portion with its opposite or bent end and adapted to engage with means of securement at the bottom of the car, substantially as described.

9. A car having its bottom provided with openings, a frame in each opening, having its inner edges provided with beveled and straight portions, and doors pivotally secured within said frame, having their opposite edges provided with straight and beveled portions to correspond with the edges of the doors, substantially as described.

10. A frame for discharge-openings in the bottom of cars, having a keeper on its under side, a door pivotally secured in the frame, and a lock or bolt in the keeper for engaging with the door, substantially as described.

11. The combination, with a frame for the discharge-openings in the bottom of cars, of a door pivotally secured therein by means of trunnions and a two-part boxing for each trunnion, the base of each of which is provided with a recess and a seat for the trunnion, and the top part fits within the recess and is provided with a seat for the trunnion, the sides of which fit down into the seat in the base, substantially as described.

DAVID R. SPRINGER.

Witnesses:
 J. S. SPRINGER,
 EMMA WOOTERS.